United States Patent [19]

Goldfarb

[11] 3,828,167

[45] Aug. 6, 1974

[54] DETECTOR FOR SELF-CLOCKING DATA WITH VARIABLE DIGIT PERIODS

[75] Inventor: William C. Goldfarb, Ithaca, N.Y.

[73] Assignee: The Singer Company, New York, N.Y.

[22] Filed: Oct. 10, 1972

[21] Appl. No.: 296,467

[52] U.S. Cl.... 235/61.11 A, 340/174.1 B, 328/165, 178/69 A

[51] Int. Cl. .......... G11b 5/00

[58] Field of Search .......... 340/174.1 B, 146.1 A; 235/61.11 A

[56] References Cited

UNITED STATES PATENTS

| | | | |
|---|---|---|---|
| 3,243,580 | 3/1966 | Welsh | 235/61.11 |
| 3,331,079 | 7/1967 | Reader | 346/74 |
| 3,491,349 | 1/1970 | Sevilla et al. | 340/174.1 |
| 3,524,164 | 8/1970 | Cox et al. | 340/146.1 |

*Primary Examiner*—Malcolm A. Morrison
*Assistant Examiner*—Vincent J. Sunderdick
*Attorney, Agent, or Firm*—Edward L. Bell; Charles R. Lepchinsky; Alfred W. Kozak

[57] ABSTRACT

A data detector for eliminating spurious pulses from a train of self-clocking data signals capable of operation over an extremely wide range of digit intervals. Deletion period circuitry including a pair of reversible counters operated simultaneously in opposite directions for establishing successive deletion periods as a function of the actual length of the most recent digit interval.

13 Claims, 2 Drawing Figures

DETECTOR FOR SELF-CLOCKING DATA WITH VARIABLE DIGIT PERIODS

BACKGROUND OF THE INVENTION

1. Field of the Invention

This invention relates to systems for detecting valid data transitions in signal trains containing both valid data and spurious signals. More particularly, this invention relates to systems for reproducing data encoded according to a phase modulation scheme on a recording medium without separate clock pulse signals.

2. Brief Description of the Prior Art

Phase modulation detection systems are known which reproduce data signals encoded on a recording medium in binary form without separate clock pulse signals. In such known systems, such as that disclosed in U.S. Pat. No. 3,209,268, binary data is recorded on a medium, e.g. magnetic tape, in the form of directional transitions. For example, when magnetic recording tape is employed as the storage medium, data is encoded as a series of directional flux transitions at regularly spaced intervals along the length of the tape. Thus, when the tape is swept past the transducer in a single direction, a transition from a first direction of magnetization to a second causes a pulse output from the transducer in a first direction, which may be arbitrarily assigned a value zero. Similarly, a transition from the second direction of magnetization to the first causes a pulse output from the transducer in a second direction. In this method of encoding, when a binary digit is followed by the same digit, e.g. zero followed by zero, the direction of magnetization must be reversed between digit intervals in order to obtain a valid signal of proper polarity. This reversal is ordinarily recorded at the midpoint of the digit intervals.

Since the midinterval reversal will the cause the read transducer to produce an output pulse which corresponds to no data, i.e. a spurious pulse, circuitry must be provided for deleting all such spurious pulses from the data signal train. Known systems provide circuitry which block all signals from the beginning of a given digit interval until a fixed period of time, called the deletion period, has elasped. Such systems function well, provided that the digit interval is substantially constant over the entire range of information signals.

The length of a digit interval depends not only on the physical spacing of the transition locations on the recording medium, but also on the relative speed between the medium and the recording transducer (during the recording of the data), and between the medium and the reproducing transducer (during reproduction of the data). Thus, digit intervals may vary as a result of variable relative velocity between medium and transducer during the recording process, variable relative velocity between medium and transducer during the reproduction process, and different recording and reproduction speeds. Those systems which operate on a fixed deletion period scheme cannot tolerate digit intervals which vary widely since the midinterval reset transitions may be reproduced long after the fixed deletion period has ended.

Systems, such as that disclosed in U.S. Pat. No. 3,243,580, have been devised which provide a variable deletion period, the length of which is determined by the average of several preceding digit intervals. While such known systems have been found to operate in a satisfactory manner in some applications, they suffer from the disadvantage of requiring prior knowledge of a median or an average digit interval in order to select circuit parameters which will provide a deletion interval which varies in accordance with the median digit interval to be expected. Further, in some data recovery systems the digit intervals vary so widely that the variable deletion period provided by known systems is incapable of blocking the midinterval reset transitions. For example, in systems employing manually operated reproducing transducers, such as those used in conjunction with point of sale systems, digit intervals have been found to vary by as much as 15 percent during a single sweep of the transducer along an encoded merchandise tag strip and by as much as a factor of ten for different manual sweeps. Because of this wide variation in digit intervals, known systems have been found to produce erroneous data output signals which render the information useless to a utilization device such as a computer.

SUMMARY OF THE INVENTION

The invention disclosed herein comprises a data detector for eliminating spurious pulses from a train of self-clocking data signals which is capable of operation over an extremely wide range of digit intervals. More particularly, the invention provides deletion period circuitry for establishing successive deletion periods as a function of the actual length of the most recent digit interval which periods are effective to block spurious signals produced by midinterval reset transitions which vary over an extremely wide range. In the preferred embodiment, a pair of reversible counters are simultaneously counted in opposite directions: each counter being incremented at a first rate from a predetermined count (e.g. zero); while capable of being decremented at a second faster rate, which is a predetermined multiple of the first rate, from a count attained at the end of a previous digit interval. After the decremented counter reaches the predetermined count (i.e. zero), data validation signals are generated which identify the next occurring signal in the input signal train as a valid data signal. The appearance of the valid data signal reverses the roles of the two counters. The ratio of the first and second counting rates is chosen to provide a deletion period which prevents validation of a signal for a fixed fractional portion of any digit interval, independently of the actual length of the interval.

The invention disclosed herein enables data signals spaced at widely varying intervals to be separated from spurious signals occurring therebetween in a self-clocking data signal train. Further, the invention may be employed with a wide variety of signal formats with excellent results. In addition, devices constructed according to the invention are simple and inexpensive to manufacture and highly reliable in operation.

For fuller understanding of the nature and advantages of the invention, reference should be had to the following detailed description taken in conjunction with the accompanying drawings.

DESCRIPTION OF THE PREFERRED EMBODIMENT

Figure 1:
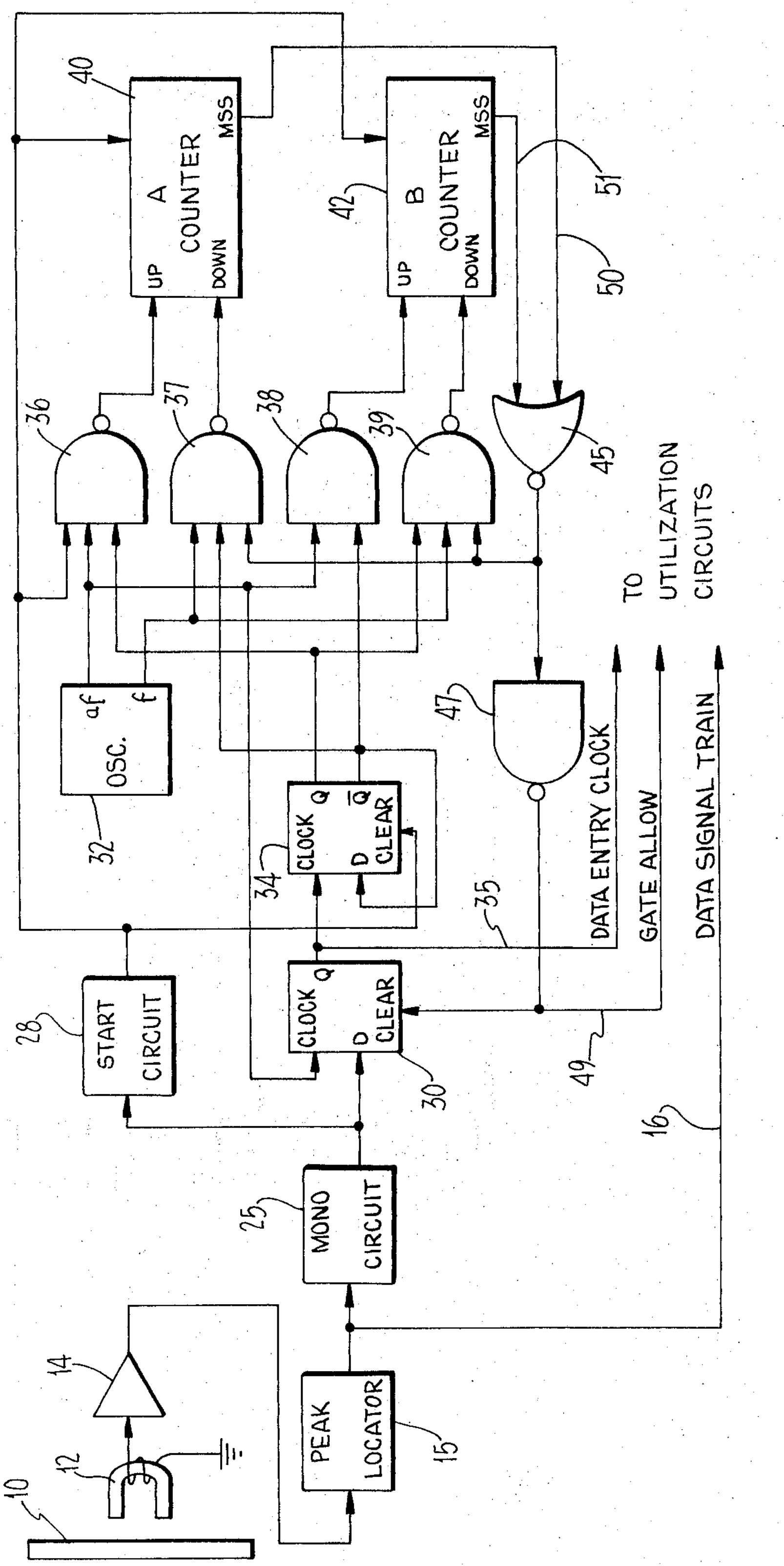
FIG. 1 is a schematic diagram illustrating a preferred embodiment of the invention.

Turning now to the drawings, FIG. 1 shows a preferred embodiment of the invention used to detect valid data signals from information recorded on a recording medium 10. Recording medium 10 may comprise a magnetic drum, magnetic tape, a magnetic strip on a merchandise tag, or the like. A reproducing transducer 12, which may be a hand-held magnetic transducer, produces a data signal train such as that shown in wave form A of FIG. 2 when transducer 12 and medium 10 are moved relative to each other along a predetermined direction of medium 10. In the example illustrated the data signal train comprises the binary digits 10011 as indicated at B in FIG. 2.

The output from transducer 12 is amplified by an amplifier 14 and applied to a conventional peak locator circuit 15 which produces an output illustrated by wave form C. In the preferred embodiment, the output signal from peak locator circuit 15 has the same polarity as the input signal thereto from transducer 12, i.e. a "1" is represented by a positive pulse which produces a positive going signal and a "0" is represented by a negative pulse which produces a negative going signal. The output of peak locator circuit 15 is coupled to a suitable utilization device, e.g. a computer, by lead 16.

When two consecutive digital data signals have the same characteristic, i.e. both represent a "1" or a "0", spurious or non-significant signals are produced by the flux reset transitions in the interval between the valid digital data signals. In wave form C, two such spurious signals are illustrated. The first such signal 20 occurs in the digit interval $T_{n-1}$ between the two consecutive "0" data signals in wave form C. The second spurious signal 22 occurs in the digit interval $T_{n+1}$ between the two consecutive "1" data signals in wave form C. Since the spurious signals 20, 22 do not represent valid data, the data signal train on lead 16 can not be used directly by a utilization device unless these non-significant signals are discriminated against.

In the phase modulation system employed with the preferred embodiment each flux reset transition occurs at approximately the mid-point of a given digit interval on recording medium 10. However, each digit interval may have a different magnitude from its predecessor or successor. Thus, means for providing a deletion interval during which no signal occurring in the data signal train is considered valid, must operate in accordance with the variable nature of succeeding digit intervals. The present invention accomplishes this by measuring the actual length of a given digit interval and generating a data validation signal for the succeeding interval after a deletion period which is a fixed fractional portion (a) of the preceding digit interval. For example (FIG. 2), if the length of a digit interval $T_{n-1}$ is measured to be 10 milliseconds, and *a* is chosen to be 0.8, then the data validation signal for the succeeding interval $T_n$ is generated 8 milliseconds after the appearance of the previous data signal (i.e. 8 milliseconds after the end of the preceding digit interval $T_{n-1}$). Likewise, if $T_n$ is measured to be 12 milliseconds, the data validation for the next interval $T_{n+1}$ is generated 9.6 milliseconds after the end of the digit interval $T_n$. The means for accomplishing this purpose will now be described.

Figure 2:
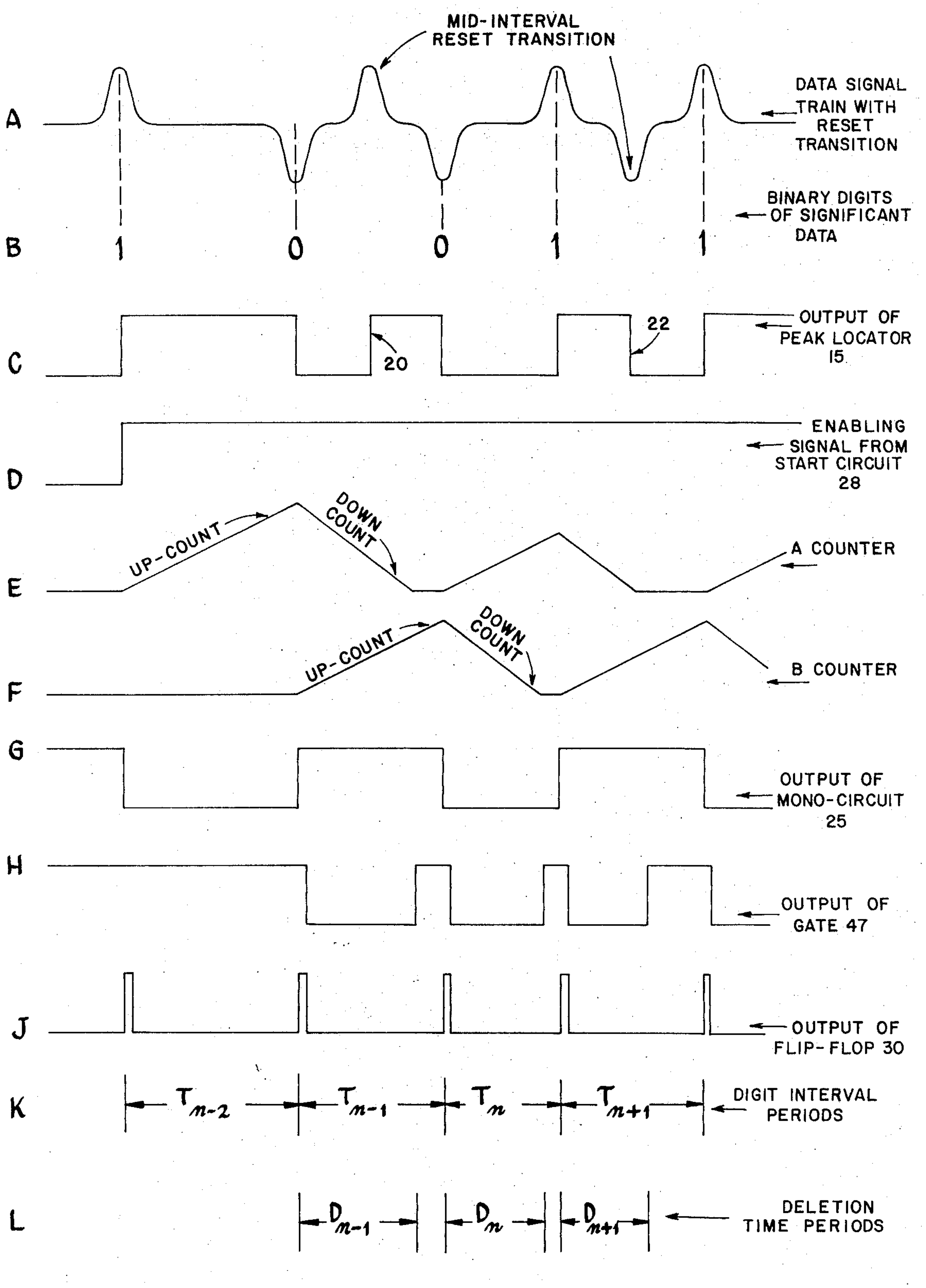
FIG. 2 is a set of wave forms which illustrate the operation of the preferred embodiment.

The output from peak locator circuit 15 is coupled to a conventional monostable circuit 25. Monostable circuit 25 produces a pulse having a fixed width whenever a sharp transition signal is applied to the input. In the preferred embodiment, monostable circuit 25 is designed to produce a 12 microsecond output pulse whenever a positive or negative edge from wave form C is applied to the input. The output of monostable circuit 25 is shown in FIG. 2 as waveform G and illustrates how each significant information pulse transition will trigger circuit 25 to produce a pulse having a fixed width as, for example, 12 microseconds (except when again triggered by an information pulse before the expiration of the fixed period).

The output of monostable circuit 25 is applied to the input of a start circuit 28 and the data input of a first flip-flop 30. Start circuit 28 produces an output signal illustrated in wave form D (FIG. 2) which generates an enabling signal for the various circuit components described below in response to the reception of a pulse from monostable circuit 25. Start circuit 28 may comprise a monostable circuit having a long time-out period relative to the length of the maximum anticipated data train. Alternatively, the period of start circuit 28 may be selected to be long relative to the length of the maximum anticipated digit interval in a given data signal train, successive data signals being relied upon to retrigger start circuit 28. Other equivalent circuits will occur to those skilled in the art.

The clock input to flip-flop 30 is provided by an oscillator 32 having a pair of outputs labeled *f* and *af*. The *f* output comprises a square wave signal of a fixed frequency (670 hertz in the preferred embodiment); the *af* output comprises a square wave signal of a second fixed frequency which is a fractional multiple *a* of the frequency *f*. The significance of the relationship between the *f* and *af* outputs from oscillator 32 is discussed below. Oscillator 32 may comprise any one of several conventional types known to those skilled in the art.

The Q or set output of flip-flop 30 is coupled to the clock input of a second flip-flop 34. The $\overline{Q}$ or reset output of second flip-flop 34 is coupled to the data input thereof.

In the preferred embodiment both flip-flops 30 and 34 are D type flip-flops. Thus, when the signal level on the data input to either flip-flop 30 or 34 is high and a clock pulse is applied to the clock input, the flip-flop is set; similarly, when the signal level on the data input is low and a clock pulse is applied, the flip-flop is reset. A signal of proper level on the clear input of either flip-flop 30 or 34 resets the flip-flop and holds it in the reset state.

The Q or set output of flip-flop 30 is made available via lead 35 to the utilization circuitry. As discussed more fully below, the signal on lead 35 may be used as a precise clock signal for identifying the beginning of each digit interval.

Flip-flop 34 is used to control the direction in which a pair of reversible counters 40, 42 are stepped. For this purpose, the Q or set output of flip-flop 34 is coupled to one input of gate 36 and gate 39. The $\overline{Q}$ or reset output of flip-flop 34 is coupled to one input of gate 37 and gate 38. The *f* signal output from oscillator 32 is coupled to gate 37 and gate 39; the *af* signal output from oscillator 32 is coupled to gate 36 and gate 38. Gate 36 is provided with an additional input signal from start circuit 28 which insures that A counter 40 will count up at the beginning of the operation of the device.

The output signals from the various control gates 36 – 39 are selectively coupled to the UP, DOWN clock inputs of the associated counters. Thus, gate 36 is coupled to the UP clocking input of A counter 40; similarly, gate 39 is coupled to the DOWN clocking input of B counter 42. The output from start circuit 28 is coupled to the reset input of counters 40, 42 to insure that each counter initially begins counting from a predetermined configuration at the start of operation of the device. In the preferred embodiment, this predetermined configuration is the counter-full state in which each counter stage holds a binary 1 digit. Thus, the first pulse into either counter will result in all zeros therein when that counter is conditioned by the associated gate 36, 38. Counters 40, 42 may comprise any one of a number of conventional reversible counters having inputs as shown. In the preferred embodiment, e.g., each counter comprises three type SN 74193 integrated circuit counters coupled in tandem. Other equivalent counters will occur to those skilled in the art. In FIG. 2, wave form E illustrates the Up-count and Down-count of the A Counter 40 while wave form F illustrates the same for the B Counter 42.

The output of the most significant stage (MSS of FIG. 1) of each counter is coupled to an inverting or-gate 45, the output of which is coupled to the input of control gates 37, 39. Whenever the most significant stage of either counter holds a count of 1, the output of gate 45 disables both control gates 37, 39, thereby preventing either counter 40 or 42 from being decremented.

The output of gate 45 is also inverted by inverting AND gate 47, and applied to the CLEAR input of flip-flop 30. Whenever the control gates 37, 39 are disabled, flip-flop 30 is enabled by the output of gate 47; conversely, whenever either control gate 37 or 39 is enabled, flip-flop 30 is disabled by the output of gate 47. Thus, flip-flop 30 is disabled whenever either counter 40 or 42 is being counted down. The output of gate 47 is also made available to the utilization circuitry via lead 49.

In operation, when the first data pulse is reproduced by transducer 12, converted to an edge signal by peak locator circuit 15 and applied to the input of monostable circuit 25, the output generated by monostable circuit 25 activates start circuit 28. The output signal from start circuit 28, illustrated at wave form D in FIG. 2, enables steering flip-flop 34, control gate 36 and counters 40, 42. Since both counters 40, 42 begin from a full count, both inputs to gate 45 are high and the resulting low level output blocks gates 37, 39 thereby preventing either counter 40, 42 from being initially counted down. The output of gate 45 is inverted by gate 47 as shown at wave form H of FIG. 2 thereby enabling flip-flop 30 to be clocked by the *af* output of oscillator 32, which sets and then resets flip-flop 30 (the latter occurring when the output from monostable circuit 25 returns to the quiescent level).

Q or set output of flip-flop 30, illustrated at J, clocks steering flip-flop 34 to the opposite state, thereby enabling gate 36 and conditioning gate 39 to be enabled when the output of gate 45 goes high. When gate 36 is enabled by start circuit 28 and steering flip-flop 34, oscillator 32 begins counting up A counter 40 at the rate *af.* No down counting occurs since gates 37, 39 are still disabled by the output of gate 45, which is still low because B counter 42 still holds a full count.

A counter 40 continues to count up at the rate *af* as illustrated by wave form E until the succeeding data signal causes monostable circuit 25 (via output wave-form G of FIG. 2) to set and quickly reset flip-flop 30. The Q or set output of flip-flop 30 clocks steering flip-flop 34 to the opposite state, thereby disabling gates 36, 39, enabling gate 38 and conditioning gate 37. At this point, A counter 40 holds a count representative of the digit interval, arbitrarily designated $T_{n-2}$, between the first and second binary data signals illustrated as the first shown time period of line *k.* As soon as B counter 42 is incremented one count by the *af* output of oscillator 32 through gate 38, the output of gate 45 goes high, thereby enabling gate 37. Thereafter, oscillator 32 counts A counter 40 down at the faster rate *f.* During this second cycle of operation, B counter 42 is counted up by oscillator 32 at the slower rate *af.*

During the deletion period $D_{n-1}$ (as) illustrated in line L of FIG. 2 when A counter 40 is being decremented to zero, the output of gate 47 is low. This signal, applied to the CLEAR input of flip-flop 30, holds flip-flop 30 in the reset state. Thus, any spurious signal such as edge signal 20 which occurs during deletion period $D_{n-1}$ while A counter 40 is being counted down has no effect on flip-flop 30.

After A counter 40 has been decremented to zero, the next oscillator pulse places A counter 40 in the counter-full state. In this state the most significant stage holds a count of "1" so that the input signal on lead 50 goes high, causing the output of gate 45 to go low. When the output of gate 45 goes low, gate 37 (as well as gate 39) is disabled and A counter 40 remains in the counter-full state for the remainder of the digit interval $T_{n-1}$. B counter 42 continues to be counted up by oscillator 32.

When the output of gate 45 goes low, the output of gate 47 goes high, enabling flip-flop 30. The next succeeding data signal causes monostable circuit 25 to set and reset flip-flop 30, which clocks steering flip-flop 34 to the opposite state, thereby enabling A counter 40 to count up and B counter 42 to count down (after A counter 40 has been incremented to zero). At this point B counter 42 holds a count representative of the digit interval $T_{n-1}$ between the second and third binary data signals.

During the third cycle of operation, A counter 40 is counted up at the slow rate *af* and B counter is counted down at the faster rate *f.* As before, flip-flop 30 is clamped to the reset state by the output of gate 47 until B counter 42 passes through zero, so that any input signals occurring during deletion period $D_n$ in the $T_n$ digit interval have no effect on flip-flop 30. After B counter 42 passes through zero, terminating deletion period $D_n$, it is held in the counter-full state until the end of this cycle. Flip-flop 30 is enabled by the output of gate 47 and again set and reset by the next appearing valid data signal. The roles of A counter 40 and B counter 42 are again reversed by steering flip-flop 34 and gates 36 – 39, and a new deletion period $D_{n+1}$ begins.

This cyclic operation continues until the end of the input data signal train causes start circuit 28 to return to the reset state. When start circuit 28 is reset, the output therefrom resets steering flip-flop 34 and places A counter 40 and B countre 42 in the counter-full condition. The system is now ready to detect a second train of data signals.

During operation of the invention, various signals are developed which are used to identify valid data signals in the input signal train. The output of gate 47 (waveform H of FIG. 2) is applied to lead 49 as a GATE ALLOW signal. As seen from a comparison of wave forms C, H, K and L, the GATE ALLOW signal on lead 49 is low during a given digit interval $T_i$ for a period $D_i$ which is a fixed fractional portion of the preceding digit interval $T_{i-1}$. Thus, the GATE ALLOW signal provides a measure of the deletion period $D_i$ during which no valid data signal can occur in the data signal train. This signal may be used to condition a data gate in the utilization circuitry to which the data signal train on lead 16 is applied. In this way, spurious signals occurring between valid data signals may be screened out from the utilization circuitry.

An important feature of the invention resides in the fact that each deletion period $D_i$ is up-dated after the end of a given digit interval $T_i$. Thus, $D_{n-1}$ has a duration $aT_{n-2}$, where $a$ is the ratio of the frequency of the two output signals from oscillator 32. Likewise, $D_n$ is given by $aT_{n-1}$, $D_{n+1}$ by $aT_n$, etc. By proper selection of the value of $a$, predetermined fractional portions of each digit interval may be screened out from the utilization circuitry. In the preferred embodiment, a value of $a$ equal to 0.75 was chosen to discriminate against the midinterval reset transitions 20, 22 illustrated in waveform C. Other values of $a$ may be chosen, depending on the nature of the spurious signals to be deleted.

The Q or set output of flip-flop 30 (wave form J OF FIG. 2) may be applied via lead 35 to provide a clocking pulse for the utilization circuitry which serves to identify the beginning of a digit interval. This signal, labeled DATA ENTRY CLOCK may be used as a synchronizing pulse, or as a precisely timed enabling pulse for conditioning a data entry gate in the utilization circuitry, if desired.

To summarize the operation of the invention, each valid data signal is used to initiate the simultaneous counting in opposite directions of a pair of reversible counters: one counter being used to measure the length of the developing digit interval $T_i$; the other counter being used to establish a deletion period $D_i$ which is a fixed fractional portion of the immediately preceding digit interval $T_{i-1}$. The deletion period signal (GATE ALLOW) establishes a period during which no valid data signal can occur in the data signal train. After the end of the deletion period, the next occurring data signal is validated by either the GATE ALLOW signal or the DATA ENTRY CLOCK signal, and the roles of the two counters are reversed. This operation continues until the end of the input data signal train.

As will be apparent to those skilled in the art, provision must be made to insure that the "initial" digit interval in a data signal train is correctly measured. This may be accomplished by encoding the data signal train in such a manner that the first two data signals are of opposite binary value, viz. "1" followed by "0" or "0" followed by "1". Alternatively, special validation circuitry may be provided for performing the same function.

As will now be evident, the above described invention provides a detector for discriminating against spurious signals occurring in the digit interval between successive valid data signals in a self-clocking data signal train. While the above provides a complete disclosure of the invention, it is understood that various modifications, alternate constructions, and equivalents may be employed without departing from the true spirit and scope of the invention. For example, the GATE ALLOW signals may be employed to enable gating circuitry to pass data signals to a utilization circuit, rather than block the passage thereo, if appropriate to a given data encoding scheme. Therefore, the above descriptions and illustrations should not be construed as limiting the scope of the invention which is solely defined by the appended claims.

What is claimed is:

1. In a phase modulation read-out system wherein successive recorded information signals are separated in time by a digit period and are translated into a series of pulse signals representing the binary values "0" and "1", successive ones of said pulse signals occurring in digit intervals $T_i$ at least some of which vary in duration, a system for eliminating spurious signals occurring within said digit intervals $T_i$ comprising:

means for generating a deletion period $D_i$ signal which is a fixed fractional portion $a$ of the proceeding one $T_{i-1}$ of said digit intervals, said deletion period signal providing a control signal for deleting said spurious signals; and wherein said deletion period signal generating means includes: a pair of reversible counters, control means for enabling a first one of said counters to be counted up at a rate $af$ to measure a digit interval $T_i$ and the remaining one of said counters to be counted down at a rate $f$ to measure a deletion period $D_i$, wherein $af$ is less than $f$ and $D_i$ equals $a$ $T_{i-1}$; and wherein said deletion period signal generating means provides means for measuring said digit interval $T_{i-1}$ and means for generating said deletion period signal $D_i$ for a period of time given by $a$ $T_{i-1}$, where $a$ is a constant less than or equal to one.

2. The apparatus of claim 1 wherein the value of $a$ is in the range $0.5 \leq a \leq 1$.

3. The apparatus of claim 1 wherein the value of $a$ is 0.75.

4. In a phase modulation read-out system wherein successive recorded information signals are separated in time by a digit period and are translated into a series of pulse signals representing the binary values "0" and "1", successive ones of said pulse signals occurring in digit intervals $T_i$ at least some of which vary in duration, a system for eliminating spurious signals occurring within said digit intervals $T_i$ comprising means for generating a deletion period $D_i$ signal which is a fixed fractional portion $a$ of the preceding one $T_{i-1}$ of said digit intervals, said deletion period signal providing a control signal for deleting said spurious signals, wherein said deletion period signal generating means comprises: a pair of reversible counters, control means for enabling a first one of said counters to be counted up at a rate $af$ to measure a digit interval $T_i$ and the remaining one of said counters to be counted down at a rate f to measure a deletion period $D_i$, wherein $af\,f$ and $D_i = a\ T_{i-1}$.

5. The apparatus of claim 4 wherein said control means includes means for reversing the roles of said counters at the end of said digit interval $T_i$.

6. The apparatus of claim 4 wherein said control means includes means for preventing further decrementing of said remaining one of said counters after a predetermined count has been attained.

7. The apparatus of claim 4 wherein said control means includes means for preventing the decrementing of said remaining one of said counters during the initial cycle of said deletion period signal generating means.

8. The apparatus of claim 1 wherein said spurious signals occur whenever two successive information signals have the same binary value.

9. The apparatus of claim 1 wherein said deletion period signal generator further includes means for generating a synchronizing signal for identifying the beginning of each said digit interval $T_i$.

10. A detector for validating information signals in a signal train comprising:

means for generating a series of pulse signals representing said information signals in binary form and spurious signals occurring in the digit intervals $T_i$ between successive ones of said information signals;

means for generating a deletion period signal serving to identify a deletion period $D_i$ during which no valid information signals can occur, said deletion period signal generating means including means for establishing the length of said deletion period $D_i$ as a function of the immediately preceding digit interval $T_{i-1}$ in accordance with the relation $D_1 = a\, T_{i-1}$, where $a$ is a constant $\leq 1$, and wherein said means for establishing the length of said deletion period $D_i$ includes a pair of reversible counters, control means for enabling a first one of said counters to be counted up at a rate $af$ to measure said digit intervals $T_i$ and the remaining one of said counters to be counted down at a rate $f$ to measure said deletion periods $D_i$, wherein $af < f$, said control means including means for reversing the roles of said counters at the end of each of said digit intervals $T_i$ so that each one of said counters counts in opposite directions during successive cycles of detector operation.

11. The apparatus of claim 10 wherein said control means further includes means for preventing further decrementing of said remaining one of said counters after a predetermined count has been attained.

12. The apparatus of claim 10 wherein said control means further includes means for preventing the decrementing of said remaining one of said counters during the initial cycle of said detector operation.

13. The apparatus of claim 10 further including means for generating a synchronizing signal for identifying the beginning of each said digit interval $T_i$.

* * * * *